United States Patent
Aoki et al.

(10) Patent No.: US 7,327,854 B2
(45) Date of Patent: Feb. 5, 2008

(54) CAPTURE DEVICE

(75) Inventors: Takahiro Aoki, Kawasaki (JP); Toshio Endoh, Kawasaki (JP); Masaki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 11/020,356

(22) Filed: Dec. 27, 2004

(65) Prior Publication Data

US 2005/0104968 A1    May 19, 2005

Related U.S. Application Data

(63) Continuation of application No. PCT/JP03/03276, filed on Mar. 18, 2003.

(51) Int. Cl.
*G06K 9/00* (2006.01)

(52) U.S. Cl. .................................... 382/100

(58) Field of Classification Search ............... 382/100, 382/107
See application file for complete search history.

(56) References Cited

U.S. PATENT DOCUMENTS

| | | | |
|---|---|---|---|
| 6,628,804 B1 * | 9/2003 | Edanami | 382/107 |
| 7,016,551 B1 * | 3/2006 | Abe et al. | 382/284 |

FOREIGN PATENT DOCUMENTS

| JP | S57-017263 | 1/1982 |
|---|---|---|
| JP | 401112183 A * | 4/1989 |
| JP | 09-307712 | 11/1997 |
| JP | 2000-011157 | 1/2000 |
| JP | 2000-105818 | 4/2000 |
| JP | 2000-148887 | 5/2000 |
| JP | 2001-167255 | 6/2001 |
| JP | 2001-292312 | 10/2001 |
| JP | 2003-30632 | 1/2002 |
| JP | 2002-281349 | 9/2002 |
| JP | 2002-342750 | 11/2002 |
| JP | 2002-342752 | 11/2002 |
| JP | 2003-030632 | 1/2003 |

OTHER PUBLICATIONS

Japanese Office Action w/English translation issued Mar. 6, 2007 in the corresponding Japanese Patent Application No. 2004-569569.
Decision of Rejection issued in corresponding Japanese Patent Application No. 2004-569569, mailed May 29, 2007.

* cited by examiner

*Primary Examiner*—Vikkram Bali
(74) *Attorney, Agent, or Firm*—Staas & Halsey LLP

(57) ABSTRACT

A capture device placed on, e.g., a desk, includes a camera in the center, and a plurality of distance sensors around the camera. By measuring distances to a capture target by use of the distance sensors, it is determined whether the capture target is held over the capture device in an attitude appropriate for the capture. When the attitude is not appropriate, a user is commanded to change the attitude of the capture target. When the attitude of the capture target becomes appropriate, the camera captures the capture target.

13 Claims, 23 Drawing Sheets

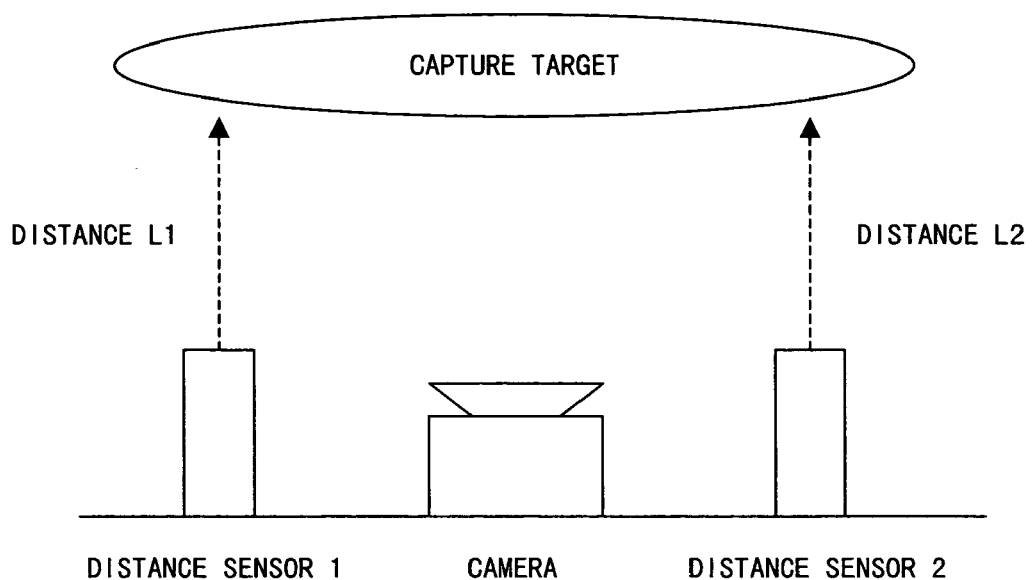
F I G. 4 A
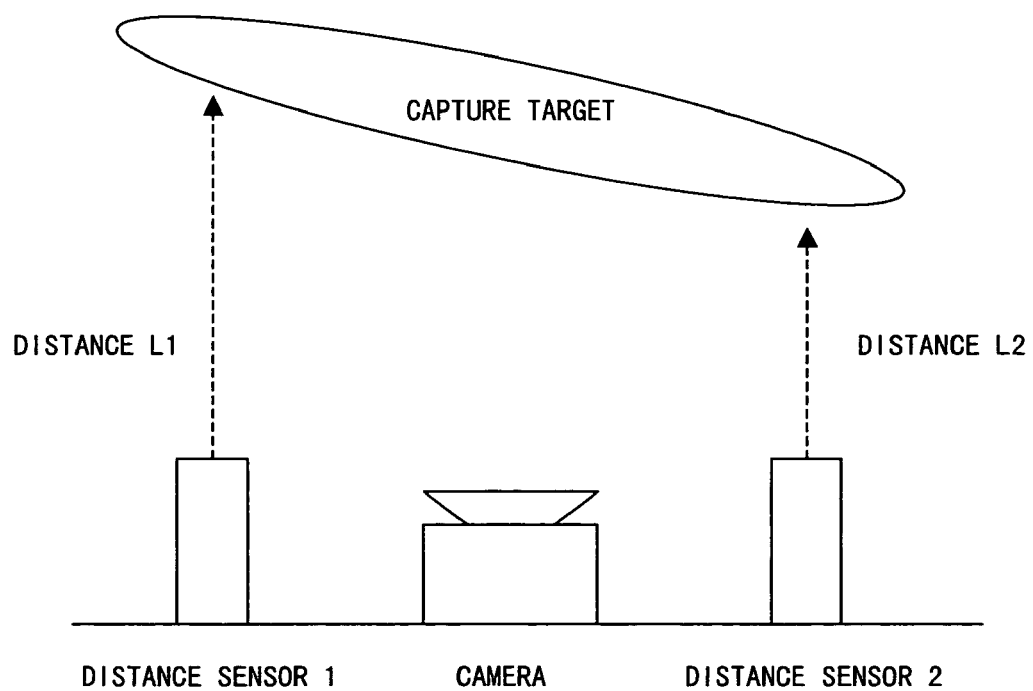
F I G. 4 B

[STORE AN IMAGE IN A BUFFER]
BUFFER   : B1 → B2 →···→ $B_N$ → B1 → B2 ····
TIME     : 1    2         N   (N+1)(N+2)

THE NUMBER OF DELIVERIES = 2,000

FIG. 22

CAPTURE DEVICE

CROSS REFERENCE TO RELATED APPLICATION

This application is a continuation of international PCT application No. PCT/JP03/03276 which was filed on Mar. 18, 2003.

BACKGROUND OF THE INVENTION

1. Field of the Invention

The present invention relates to a capture device for capturing a capture target in a non-contacting manner.

2. Description of the Related Art

FIG. 1 shows an outlined structure of a conventional non-contact capture device.

A conventional capture device for reading, e.g., a receipt in a non-contacting manner is disclosed in, e.g., patent documents 1 and 2.

In FIG. 1, a document 13 to be read is placed on a base 12. A header portion 10 is on a strut 11. A reading device is in the header portion 10. An image captured by the reading device is sent to, e.g., a PC 14, where a process for reading receipts, for example, is executed.

[Patent Document 1]
Japanese Patent Application Laid-Open No. 2002-342752
[Patent Document 2]
Japanese Patent Application Laid-Open No. 2000-148887

Conventional non-contact capture devices are so structured that a capture target such as a document is placed on the base, above which a reading device such as a camera is mounted. By use of such a structure, the capture target can be captured in a stable state.

However, in this structure, there is a problem that the unit becomes large entirely and thus inconvenient, because the base on which the capture target is placed is needed. To avoid this problem, a method for holding the capture target over the capture device placed below can be considered. However, in this method, there is a problem that a displacement and tilt of the capture target occurs. There is also a problem that the method is dependent on an illumination condition of a place where the capture target is captured. Additionally, taking into consideration, e.g., a case in which a user holds the capture target over the unit, it is difficult that the capture target remains stationary. Therefore, it becomes a big problem to find the best timing for capturing an image.

SUMMARY OF THE INVENTION

An object of the present invention is to provide a capture device for accurately reading a capture target in a manner that the capture target is held over a capture unit in the device.

To attain the object, a preferred aspect of the present invention resides in a capture device for capturing an image of a capture target to process information about the capture target, includes: a capture unit for capturing the capture target; plural distance sensors for measuring a distance from the capture unit to the capture target; and a determination unit for determining an attitude and position of the capture target from results of measurements by the plural distance sensors. The capture device is characterized in that the capture target is captured in a manner that the capture target is held over the capture unit.

According to the aspect of the present invention, because the capture target can be captured in a manner that the capture target is held over the capture unit, a conventional base, etc, is unnecessary, thus achieving a compact capture device.

Other and further objects, features and advantages of the invention will appear more fully from the following description.

BRIEF DESCRIPTION OF THE DRAWINGS

FIG. 4A shows a top-and-bottom or side-by-side positional relationship between a camera and a pair of distance sensors;

FIG. 4B shows a top-and-bottom or side-by-side positional relationship between the camera and a pair of the distance sensors;

FIG. 22 is a diagram showing a modification point when the capture device according to the embodiment of the present invention is used as a unit for reading receipts.

DESCRIPTION OF THE PREFERRED EMBODIMENTS

Figure 1:
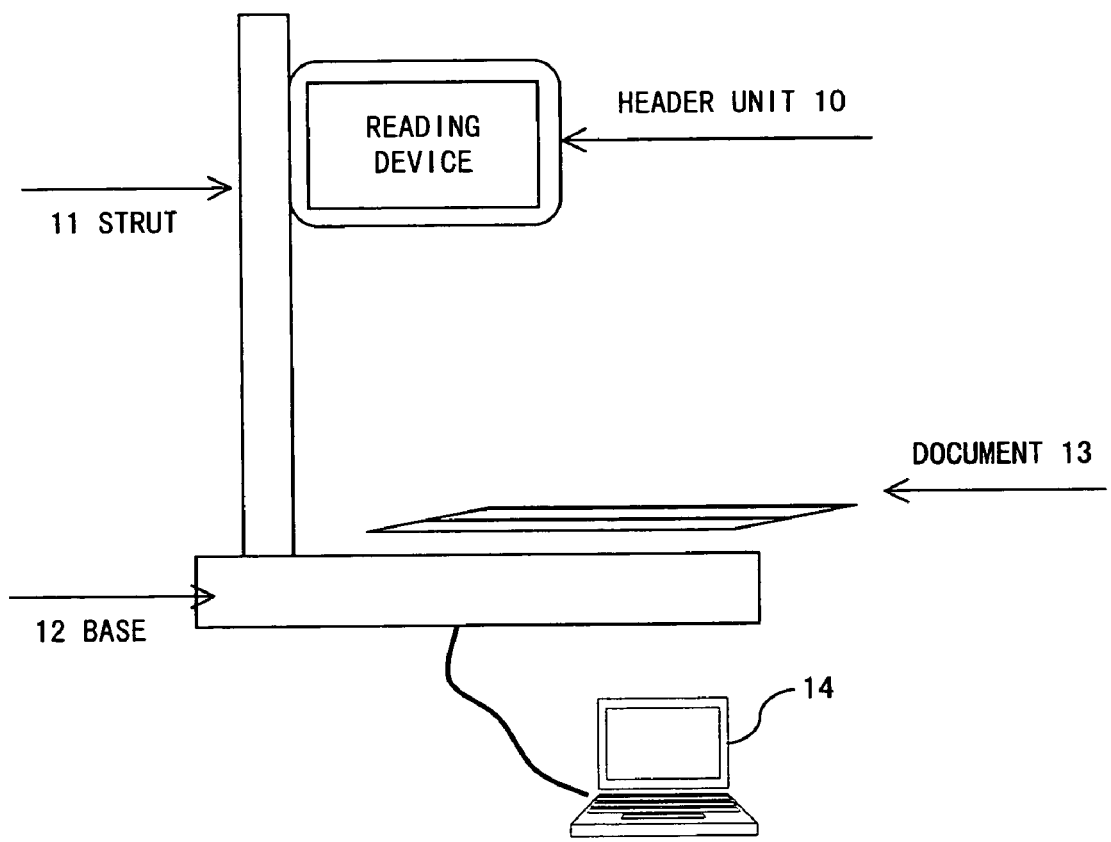
FIG. 1 is an outline structure showing a conventional non-contact capture device.
Figure 2:
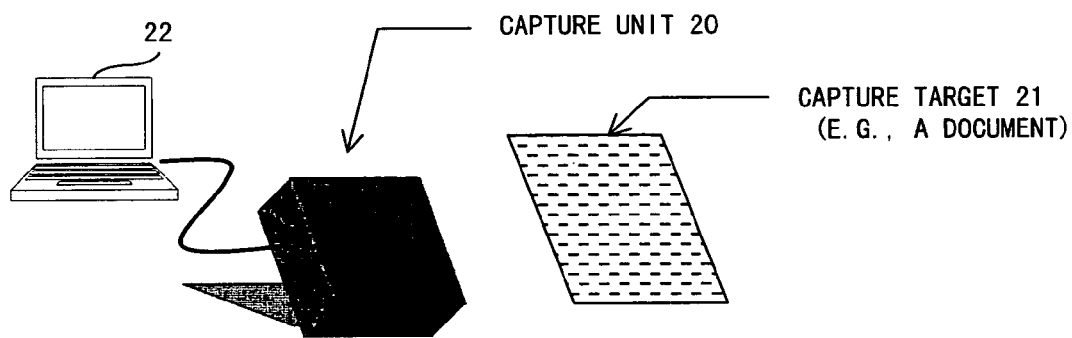
FIG. 2 is an external view of a non-contact capture device according to an embodiment of the present invention.

FIG. 2 is an external view of a non-contact capture device according to an embodiment of the present invention.

A capture device 20 is connected to a personal computer 22, and placed directly on, e.g., a desk. A capture direction of the capture device 20 faces upward. A capture target 21 such as a document is placed so that the capture target 21 is held over the capture device 20. Then, the capture device 20 captures the capture target 21 which a user holds over the capture device 20.

In the embodiment of the present invention, the capture device having plural distance sensors is used. In the capture device 20, a camera and the plural distance sensors are installed. An image captured by the capture device 20 is sent to, e.g., the personal computer 22, in which, for example, a receipt is read. This capture device 20 has a function for capturing the capture target 21 such as the receipt in as favorable a state as possible.

The capture device 20 includes the plural distance sensors. A state (a tilt and displacement relative to the capture device) of the capture target is calculated from measured values of the distance sensors to acquire a favorable image.

Figure 3:
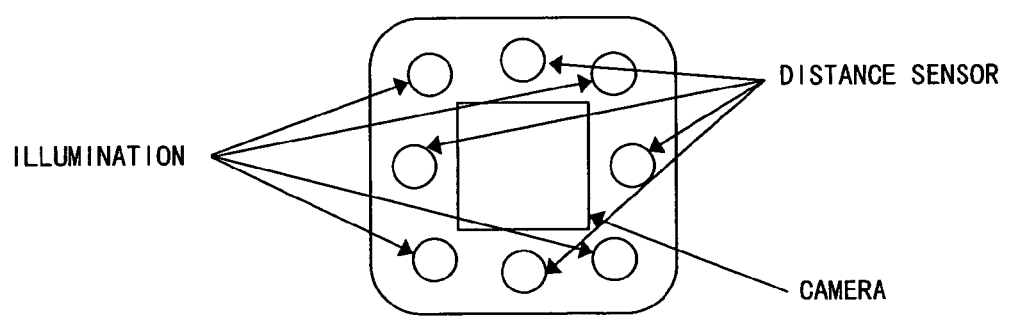
FIG. 3 shows an arrangement of a camera, distance sensors, and illuminations in the capture device.

FIG. 3 shows an arrangement of the camera, the distance sensors, and illuminations in the capture device. The capture target is captured by the camera in the center of the capture device. A distance to and a tilt of the capture target are calculated using the distance sensors around the camera. The illuminations can be also mounted adjacent to the distance sensors.

FIG. 4 shows a top-and-bottom or side-by-side positional relationship between the camera and a pair of the distance sensors.

As shown in FIG. 4A, the two distance sensors are placed to measure distances from the sensors to the capture target. When the capture target is placed in parallel, values of distances L1 and L2 of FIG. 4A are almost the same. On the other hand, when the capture target is tilted, the result becomes L1>L2 as shown in FIG. 4B. Therefore, by comparing L1 and L2, it can be determined whether the capture target is tilted.

Additionally, from measured values of the distance sensors, a tilt angle of the capture target can be acquired as follows.

Figure 5:
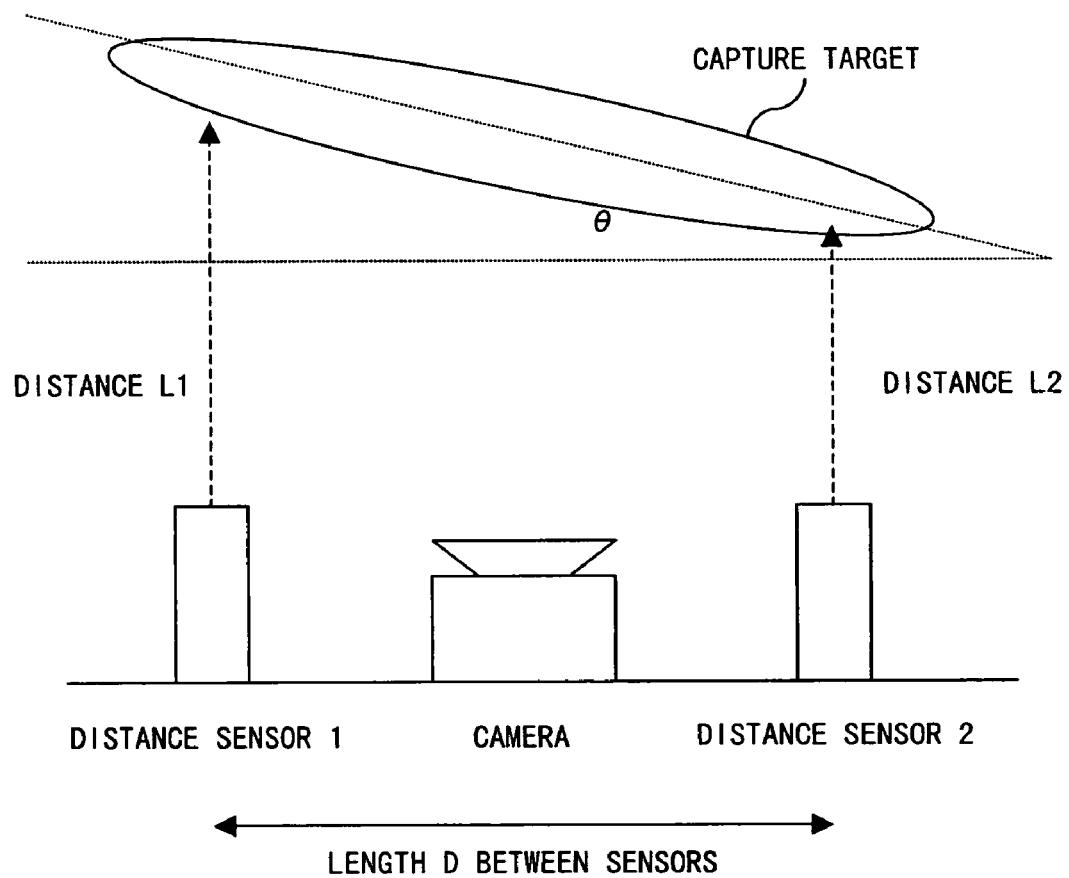
FIG. 5 explains a method for calculating a tilt of the capture target.

FIG. 5 is a diagram showing a method for calculating a tilt of the capture target.

As shown in FIG. 5, outputs of distance sensors 1 and 2 are respectively L1 and L2.

A tilt angle $\theta$ of the capture target is found by $\tan \theta = (L1-L2)/D$, where D is a distance between the two distance sensors.

By use of $\theta$ found as described above, a tilt of an image is corrected to cancel an influence of the tilt.

As a transformation for correcting an image of a tilted capture target, "central projection transformation" is used. The following book, pages after page 586, can be referenced about the central projection transformation.

[Handbook of Image Analysis], University of Tokyo Press, first published on Jan. 17 1991, ISBN: 4-13-061107-0

A displacement of the capture target can be measured as follows.

Figure 6:
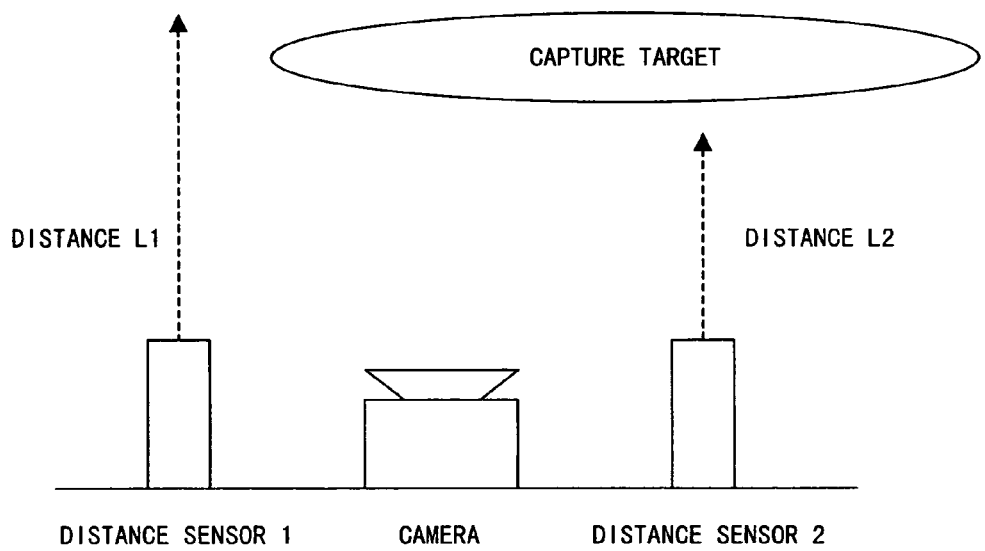
FIG. 6 shows a method for measuring a displacement of the capture target.

FIG. 6 is a diagram showing how to measure the displacement of the capture target.

As shown in FIG. 6, when the capture target is displaced, the distance sensor 1 cannot measure a correct distance. Therefore, it is checked whether a result of a measured distance of the distance sensor is an abnormal value to determine whether the capture target is displaced.

Additionally, information about a distance to the capture target can be acquired.

A state of the capture target acquired as described above is displayed so that a user can understand the state.

The user sees this display to acquire a message about whether the capture target is tilted, displaced, or placed at an appropriate distance. For example, to induce the user to tilt the capture target at an optimum angle, a message "tilt a capture target 10 degrees" is shown as a display on a screen, as sound, or as a CG animation, and a pitch of an alarm is changed.

Additionally, by providing an illumination function in the capture device, the capture becomes possible without an influence of an external illumination environment. The illumination function can include plural wavelengths. Namely, illuminations for illuminating a visible light wave and a ultraviolet wave or infrared wave are placed around the camera of the capture device. For example, by use of the plural wavelengths, counterfeit banknotes can be detected in the capture device. The capture device also includes a function for adjusting strengths of the illuminations in accordance with outputs of the distance sensors to always acquire an optimum image regardless of a distance of the capture target.

Furthermore, because a document held over the capture device is difficult to stably hold for a long time, it is important which timing is the best for capturing an image and sending it to, e.g., a process of the personal computer. Particularly, when an interface between the capture device and, e.g., the personal computer is slow, and when a quality of the image is determined in the personal computer, it is highly possible that the best timing for the capture is missed. In the embodiment of the present invention, to avoid the above problem, a capture time determination portion for measuring a capture timing, and a buffer are provided in the capture device to record an image deemed optimum in the buffer. The concrete procedure is as follows. Outputs of the distance sensors are traced at a predetermined interval. Time variation of the distances is measured, and an image is captured at a timing at which the time variation becomes small, and stored in the buffer. The image in the buffer is sent to the personal computer for reading receipts.

A tilt and displacement of the capture target can be detected by measuring distances to the capture target by use of the plural distance sensors. As a result, when the tilt and displacement are large, a current state of the capture target is displayed to a user, the user is induced to make the capture target in a correct state, thus realizing a more comfortable capture. For example, it is assumed that a document is captured by use of the capture device, and an image of the document is sent to the personal computer, where characters of the document are recognized. When a document, tilted by the user, is captured, the document cannot be detected by a conventional capture device. Accordingly, the characters of the document cannot be read in the personal computer, while the user cannot understand a reason of a failure of the reading. On the other hand, because a tilt of the document can be detected by use of the capture device according to the embodiment of the invention, the user can see a display representing a current tilt of the capture target to understand the reason of the failure, realizing an easy retry of the capture.

By providing an illumination device in the capture device, the capture can be achieved without an influence of an external illumination environment. By use of different wavelengths as the illuminations, the determination of counterfeit banknotes, for example, can be achieved using the present capture device. By adjusting the strengths of the illuminations in accordance with outputs of the distance sensors, an optimum image can be acquired regardless of a distance to the capture target.

Additionally, the capture target such as a document is difficult to hold over the capture device for a long time. Therefore, it is important which timing is the best for capturing an image of the capture target. In the embodiment of the present invention, to solve the above problem, the capture time determination portion for determining a capture timing, and the buffer are provided in the capture device. The concrete procedure is as follows. Output values of the distance sensors are traced at a predetermined interval to measure time variation of the distances. At a timing at which the time variation becomes small, a movement of the capture target is deemed small, so that an image captured at this timing is recorded in the buffer. This image in the buffer is sent to the personal computer in which, for example, receipts are read. As described above, the capture timing is determined in the capture device to remove an influence of a delay caused by the interface between the capture device and personal computer.

Figure 7:
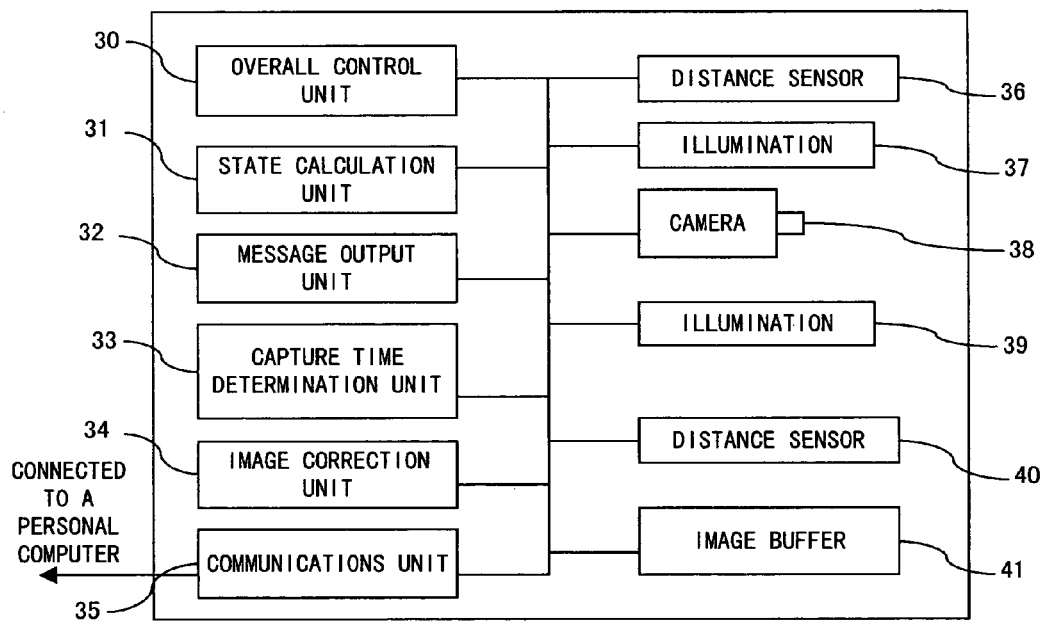
FIG. 7 shows a structure of the capture device according to the embodiment of the present invention.

FIG. 7 shows a structure of the capture device according to the embodiment of the present invention.

An overall control portion 30 controls the entire unit including an image correction portion 34, a message output portion 32, and a state calculation portion 31. In accordance with an output result of each portion, the overall control portion 30 controls a camera 38 and an illumination 39, etc.

The state calculation portion 31 calculates a state of a capture target in accordance with outputs of distance sensors 36 and 40. For example, the state calculation portion 31 outputs results such as "no capture target is held over the capture device", "a capture target is held over the capture device, but displaced", and "a capture target is held over the capture device, and tilted X degree".

The message output portion 32 outputs calculation results of, e.g., the state calculation portion 31. For example, when an output of the state calculation portion 31 is "a capture target is held over the capture device, but displaced", this information is notified to a user. Examples of the concrete notification method are a character string, a display such as an LED, a sound message, and a CG animation.

The capture time determination portion 33 traces outputs of the distance sensors 36 and 40 to determine an optimum image by determining whether time variation of the distances is under a predetermined value. By use of the capture time determination portion 33, an image of, e.g., a capture target placed too far or moving and shaking can be previously removed. The concrete procedure is as follows. The capture time determination portion 33 stores an image captured by the camera into an image buffer 41 in the capture device at a predetermined interval. In addition to the image information, captured time information and outputs of the distance sensors are stored in the image buffer 41. In the capture, illumination strengths can be adjusted in accordance with output values of the distance sensors. For example, an average distance is found from outputs of the plural distance sensors to adjust a voltage supplied to the illuminations so that the voltage is inversely proportional to the average distance. The capture time determination portion 33 selects an image at a time that a distance to a capture target is within a predetermined value and at a time that the time variation of the distances is small in comparison with previous and later times, and outputs the selected image.

The image correction portion 34 corrects the captured image in accordance with a calculation result in the state calculation portion 31. Concretely, the image correction portion 34 cancels a tilt $\theta$ of the capture target, the tilt $\theta$ being acquired in the state calculation portion 31. A communications portion 35 processes communications with, e.g., the personal computer.

Figure 8:
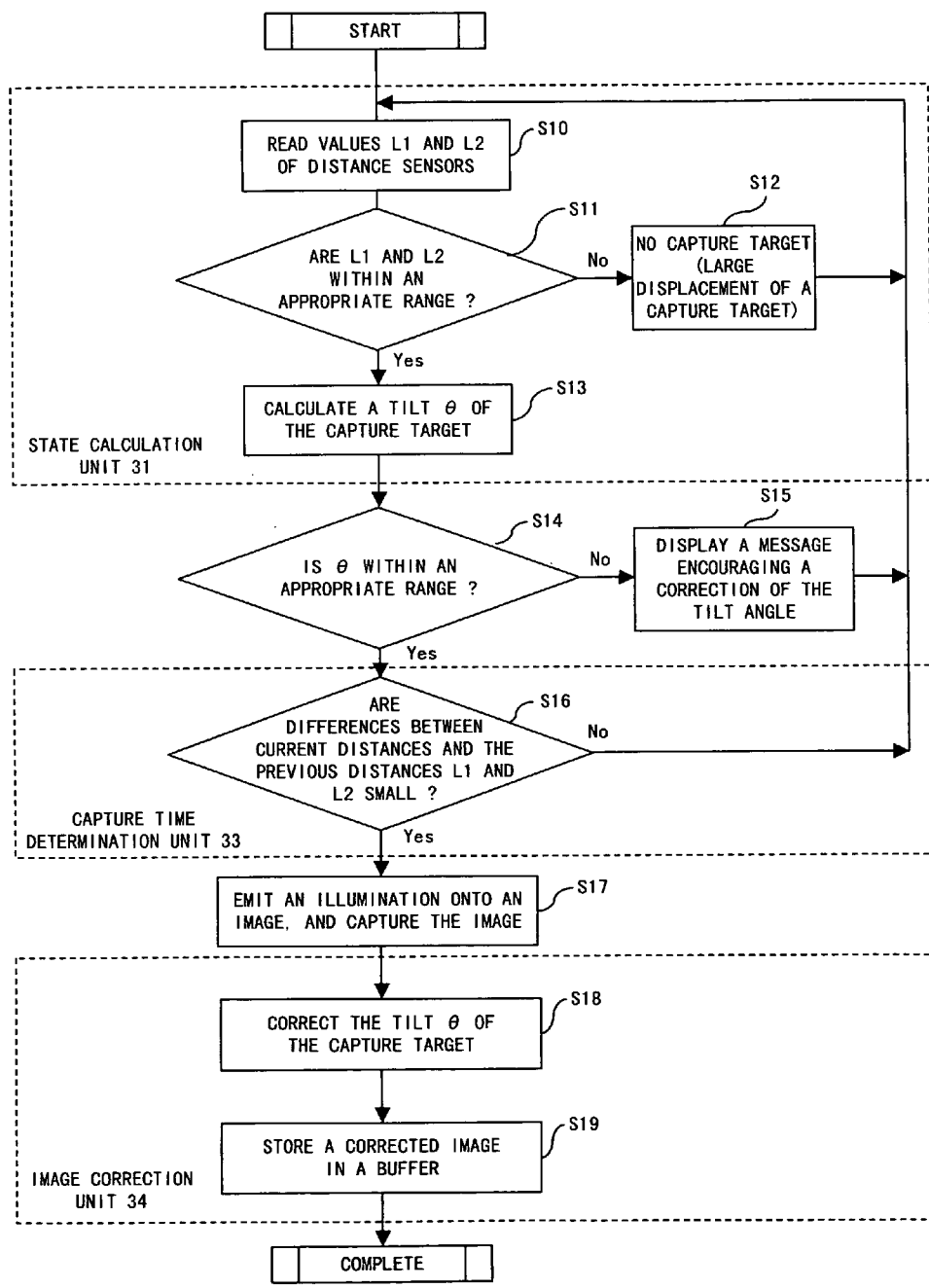
FIG. 8 is an outline operation flow of the capture device according to the embodiment of the present invention.

FIG. 8 is an overview operation flow of the capture device according to the embodiment of the present invention.

First, in Step S10, values L1 and L2 of the distance sensors are read. In Step S11, it is determined whether L1 and L2 are in the range of appropriate values. When the determination is NO in Step S11, it is determined that no capture target exists (the capture target is largely displaced) in Step S12, and the flow returns to Step S10. When the determination is YES in Step S11, a tilt $\theta$ of the capture target is calculated in Step S13. Then, it is determined whether the tilt $\theta$ is in the range of appropriate values in Step S14. When the determination is NO in Step S14, a message encouraging a correction of the angle is displayed in Step S15, and the flow returns to Step S10. When the determination is YES in Step S14, it is determined whether differences between currently measured distances and previously measured L1 and L2 is small in Step s16.

When the determination is NO in Step S16, the flow returns to step S10. When the determination is YES in Step S16, illuminations are illuminated onto an image, which is then captured in Step S17. A tilt $\theta$ of the capture target is corrected in Step S18, and then stored in the buffer in Step S19 to complete this process.

FIGS. 9 to 12 are diagrams showing a detailed operation algorithm of the capture time determination portion 33 and an image data format generated in the algorithm.

Figure 9:
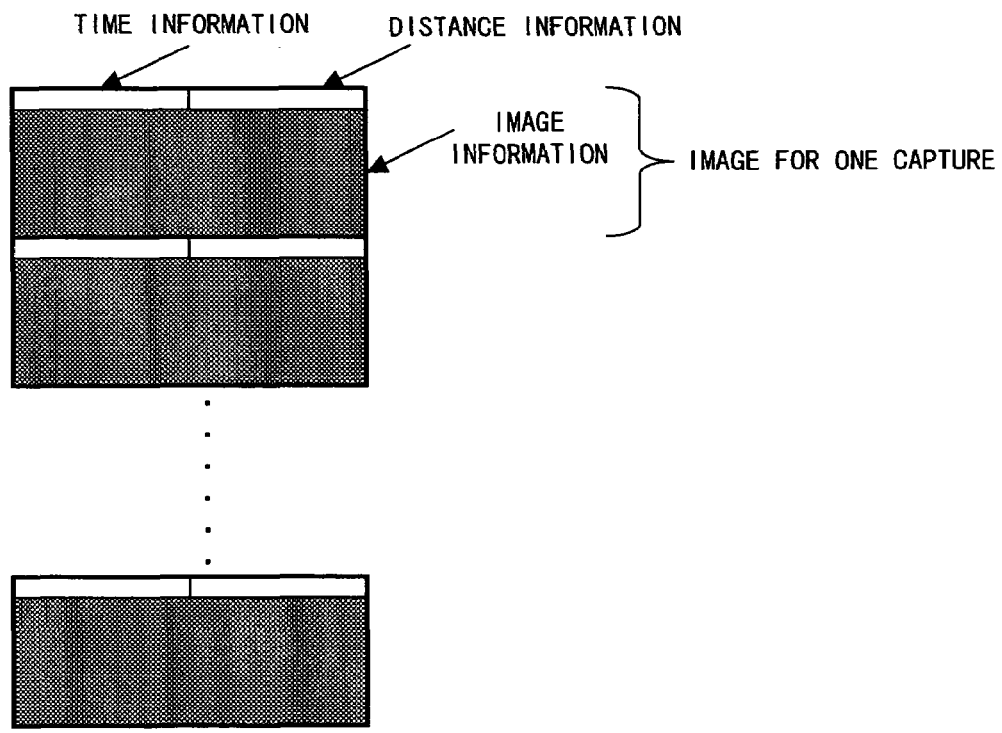
FIG. 9 is a diagram (No. 1) showing a detailed operation algorithm of a capture time determination portion 33 and an image data format generated.

When image data is stored in the buffer, image information is provided with time information and distance information, as shown in FIG. 9.

The time information represents a time at which the image is captured. For example, the time information may be "a clock time" or "a time elapsed after the unit is turned on", or may be numbered "continuous numbers (a first image=1, a second image=2, - - - )" when the image is captured at a certain interval.

The distance information stores a distance at which the image is captured. For example, when there are four distance sensors, the distance information stores output values (distances) of the four distance sensors. An average value of four distances may be stored.

Figure 10:
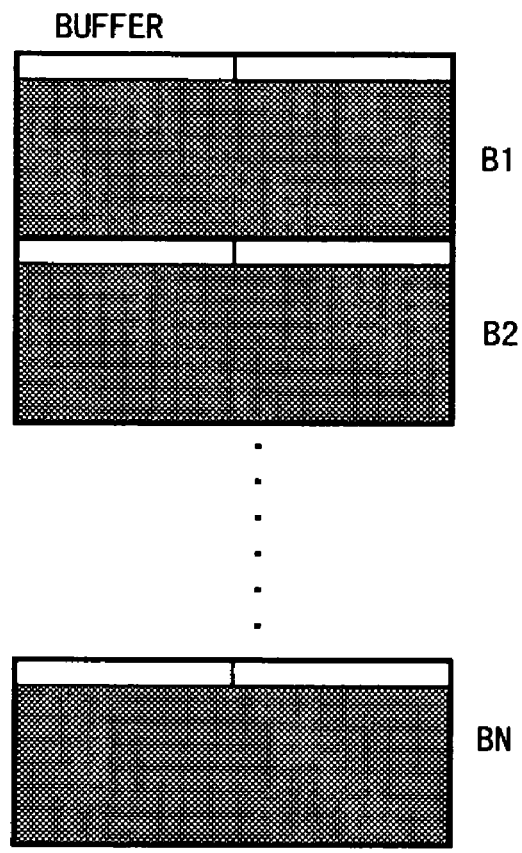
FIG. 10 is a diagram (No. 2) showing a detailed operation algorithm of the capture time determination portion 33 and the image data format generated.

Next, operation of the capture time determination portion 33 is explained in reference to FIG. 10.

The capture time determination portion 33 monitors time variation of distances measured by the distance sensors, and manages an optimum image.

The buffer is divided into N areas, which are then sequentially provided with B1, B2, - - -, $B_N$. Images are captured at a certain interval, and stored in these divided buffers. Together with image data, the time information (1) and the distance information (2) are stored in the buffers. Because there are only N buffers, the buffer B1 is used again when the buffers are filled with these pieces of the information. When the times are described as 1, 2, - - - (T−1), T, (T+1), usage of each buffer is as shown in FIG. 10.

As described above, the buffers store previous images during a specific period, including a current image.

When a query for a latest image is received from the overall control portion 30, the capture time determination portion 33 returns an optimum image in accordance with the following operation.

The following two criteria are used to determine an optimum image in the images in the buffers.

(1) Whether a distance to the capture target is within a specific range.
(2) Whether time variation of distances to a capture target is small.

(1) First, it is determined whether a distance to the capture target is within a specific range. A measured distance measured by an m-th distance sensor at a time T is Lm(T). An average of distances to the capture target at a time T is found by the following expression.

$L(T)=(L1(T)+L2(T)+ \text{- - -} +L_M(T))/M$, where $M$ is the number of the distance sensors.

It is determined whether L(T) is in the range of predetermined thresholds ($L_{min}$, $L_{max}$). Only images when L(T) is in the range of the predetermined thresholds are used as candidates of an optimum image.

(2) Next, it is determined whether time variation of the distances to the capture target is small. An image at a time T is assumed to exist. Distance differences between the image at T and an image at one previous capture time (T−1) and between the image at T and an image at one later capture time (T+1) are calculated.

Distance difference between the image at T and the image at one previous capture time (T−1) . . .

$\Delta L_-=|L(T)-L(T-1)|$

Distance difference between the image at T and the image at one later capture time (T+1) . . .

$\Delta L_+=|L(T)-L(T+1)|$

Average distance difference . . . $\Delta L_{AVG}=(\Delta L_-+\Delta L_+)/2$

An image having an average distance difference $\Delta L_{AVG}$ under a predetermined threshold and having the smallest average distance difference $\Delta L_{AVG}$ among those in $B_1$ through $B_N$ is returned as an optimum image.

Figure 11:
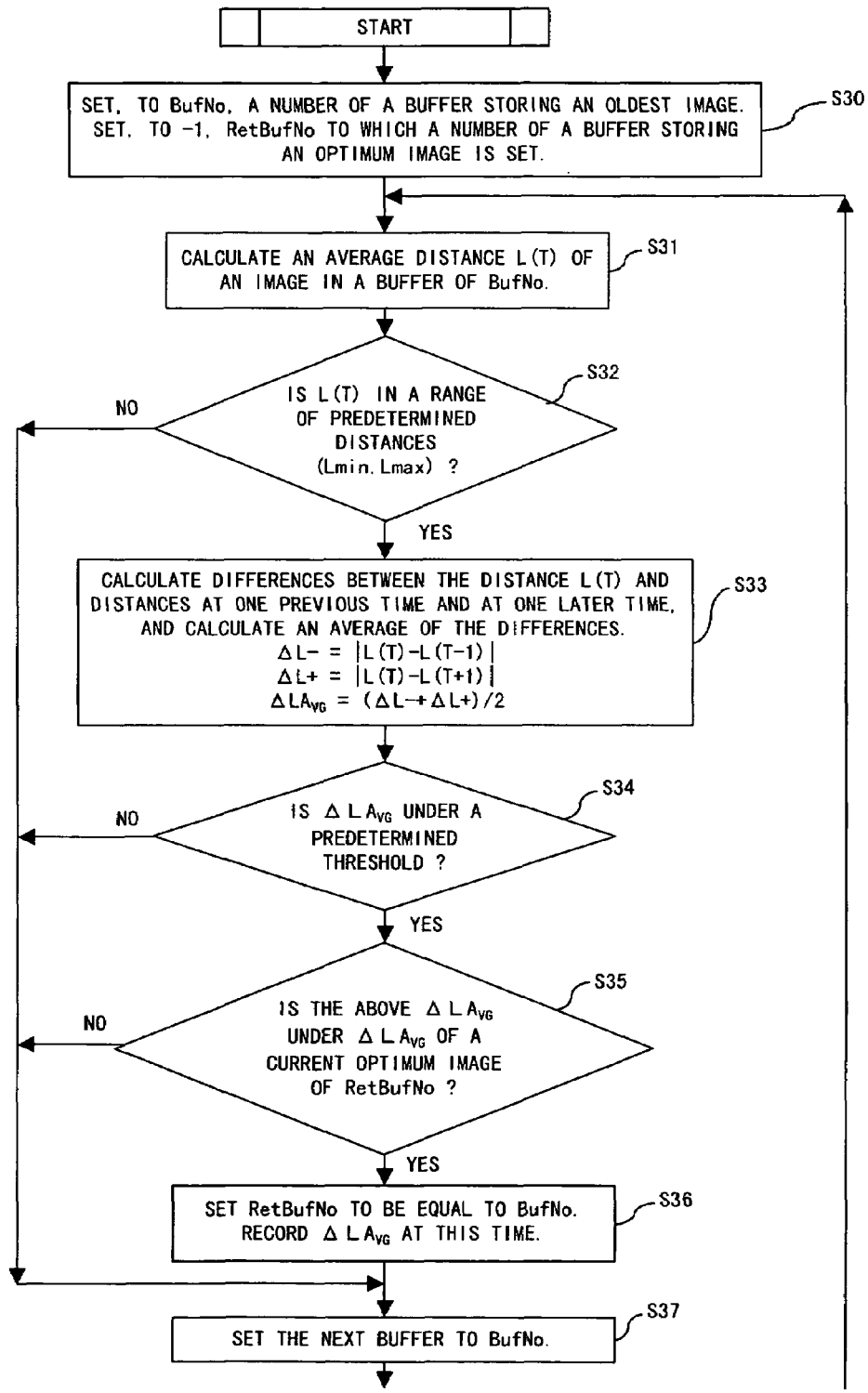
FIG. 11 is a diagram (No. 3) showing a detailed operation algorithm of the capture time determination portion 33 and the image data format generated.
Figure 12:
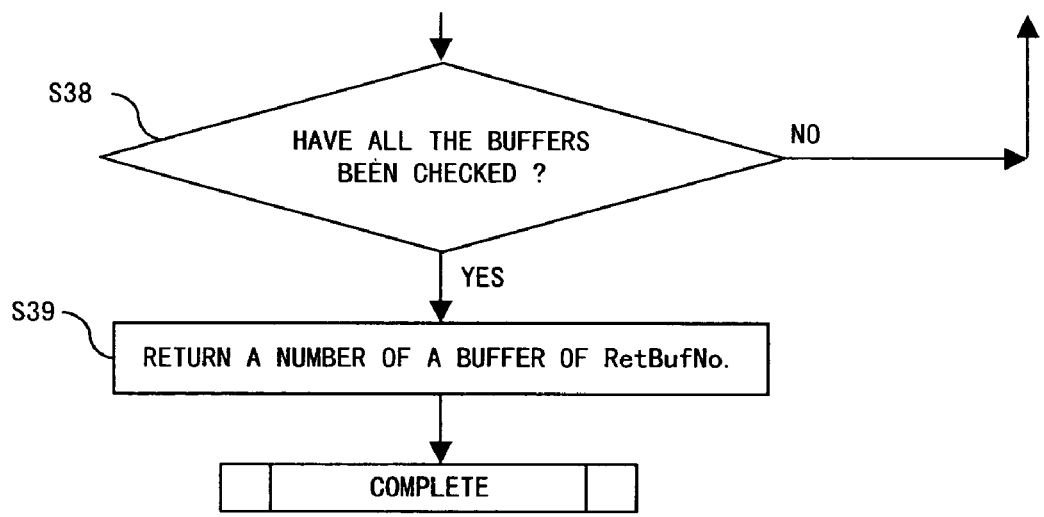
FIG. 12 is a diagram (No. 4) showing a detailed operation algorithm of the capture time determination portion 33 and the image data format generated.

FIGS. 11 and 12 are flowcharts showing operation of the capture time determination portion 33.

First, in Step S30, a number of the buffer at the most previous time is recorded in a variable BufNo. A number of an optimum buffer when the buffers are being retrieved is recorded in RetBufNo (first, RetBufNo is set to −1). At a time that the last buffer has been checked, a buffer shown by RetBufNo represents an optimum image.

Next, by changing BufNo, all the buffers are evaluated. First, in Step S31, an average distance value L(T) of an image shown by BufNo is calculated. In Step s32, it is determined whether L(T) is in the range of thresholds ($L_{min}$, $L_{max}$). When the determination in Step S32 is NO, the flow goes to Step S37. When the determination in Step S32 is YES, the flow goes to Step S33, where $\Delta L_{AVG}$, an average value of time variation of the distance, is found. In Step S34, it is determined whether $\Delta L_{AVG}$ is under a predetermined threshold. When the determination in Step S34 is NO, the flow goes to Step S37. When the determination in Step S34 is YES, the flow goes to Step S35. In Step S35, it is determined whether this $\Delta L_{AVG}$ is under an average value $\Delta L_{AVG}$ of time variation of a distance of a current optimum image shown by RetBufNo. When the determination in Step S35 is NO, the flow goes to Step S37. When the determination in Step S35 is YES, RetBufNo=BufNo is set in Step S36. In Step S37, the next buffer is set to BufNo. In Step S38, it is determined whether all the buffers have been checked. When the determination in Step S38 is NO, the flow returns to Step S31. When the determination in Step S38 is YES, a number of the buffer of RetBufNo is outputted in Step S39 to complete this process.

FIGS. 13 to 17 are diagrams showing operation of the state calculation portion.

1. When there are two distance sensors. There are the following three patterns in accordance with output values L1 and L2.

Figure 13:
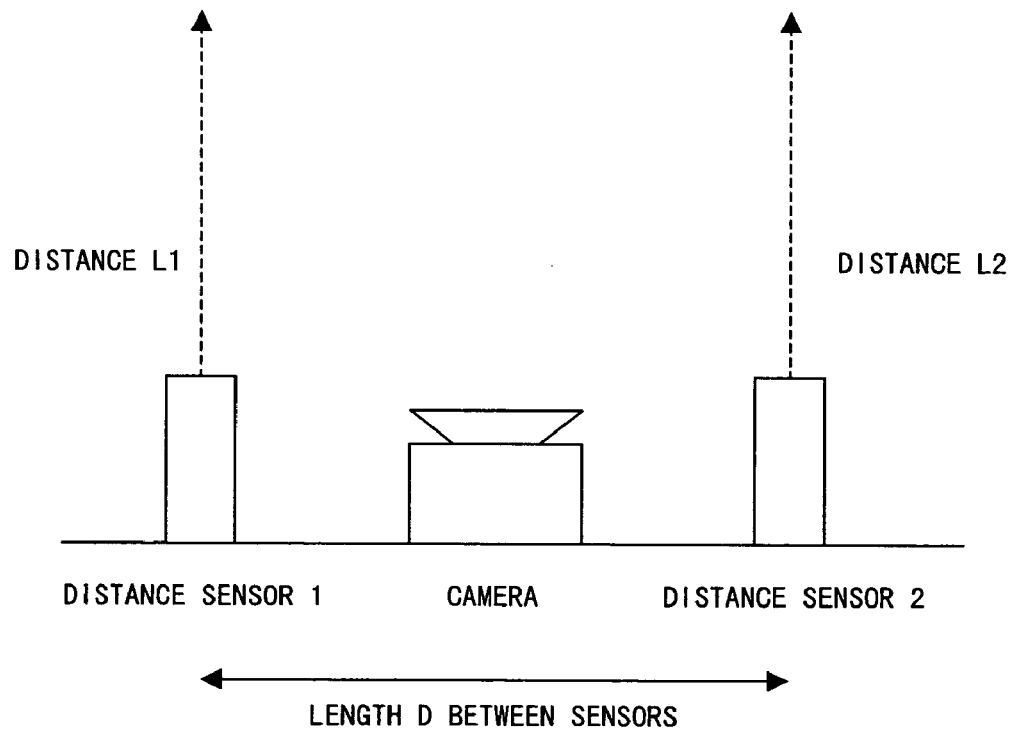
FIG. 13 is a diagram (No. 1) showing operation of a state calculation portion.

(1) No capture target is held over the capture device (FIG. 13).

In this case, the two distance sensors cannot measure values of the distances.

L1=Measurement is impossible.
L2=Measurement is impossible.

In this case, the capture device does not execute any operation.

Figure 14:
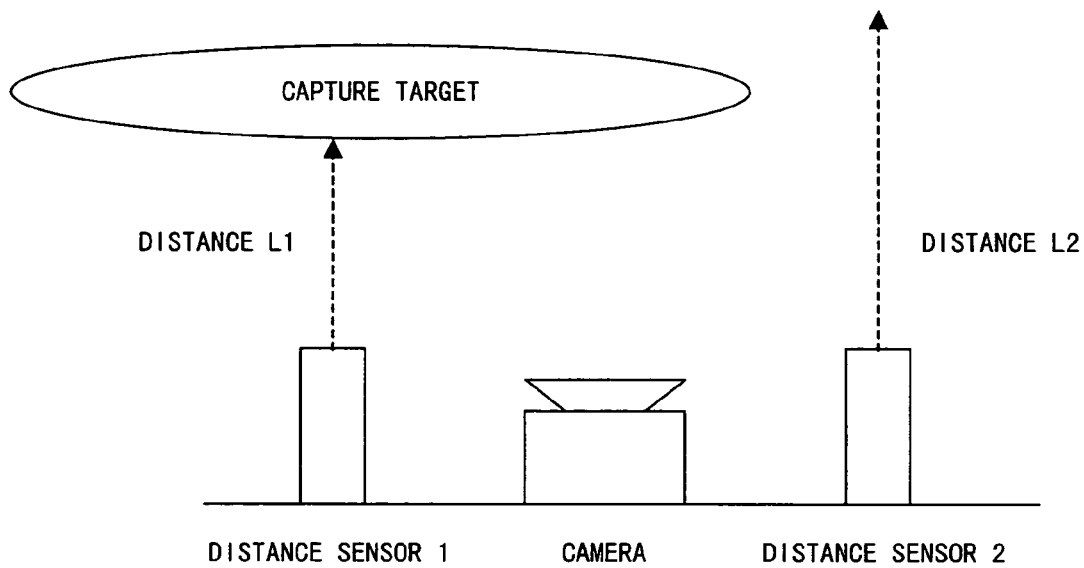
FIG. 14 is a diagram (No. 2) showing operation of the state calculation portion.

(2) When a capture target is held over the capture device, but displaced (FIG. 14).

In this case, one of the two distance sensors outputs a normal value, and another cannot measure the distance. For example, in such a case as shown in FIG. 14, measured values are as follows.

L1=Normal value.
L2=Measurement is impossible.

When the capture target is displaced, the capture device displays a message encouraging a correction of the displacement.

Figure 15:
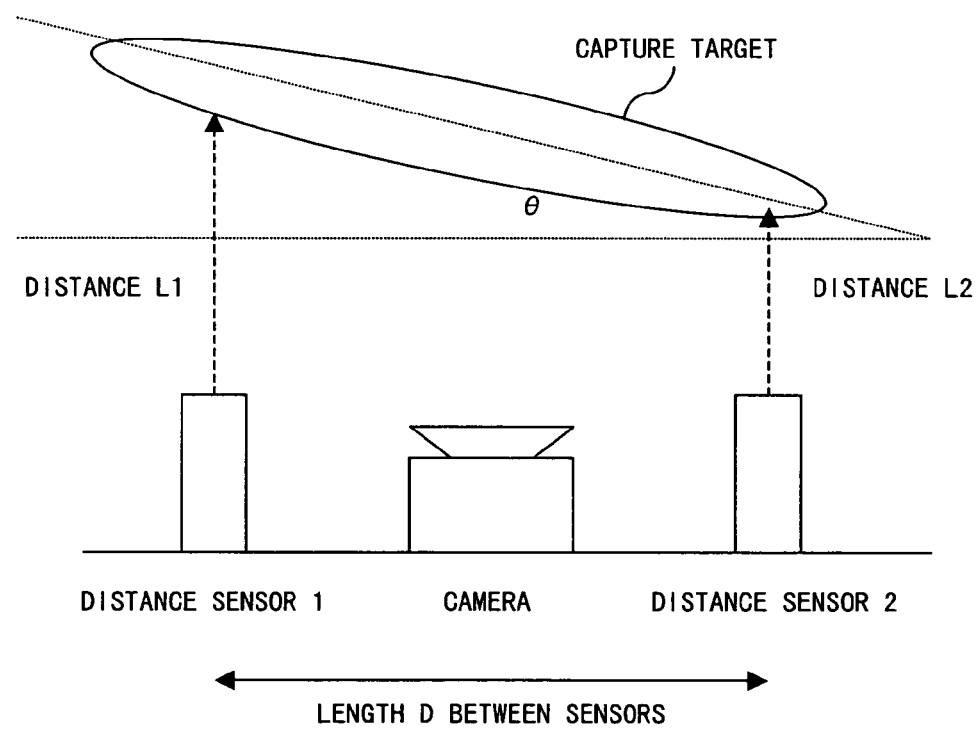
FIG. 15 is a diagram (No. 3) showing operation of the state calculation portion.

(3) When the capture target is held over the capture device without displacement (FIG. 15).

In this case, both the two distance sensors output normal values.

L1=Normal value.
L2=Normal value.

A tilt angle θ is found by tan θ=(L1−L2)/D, where D is a distance between the two distance sensors.

By use of the tilt angle θ found as described above, the image correction portion corrects and cancels a tilt of the image.

When the tilt angle θ is large, a message encouraging a correction of the tilt is displayed.

2. When there are four distance sensors.

Figure 16:
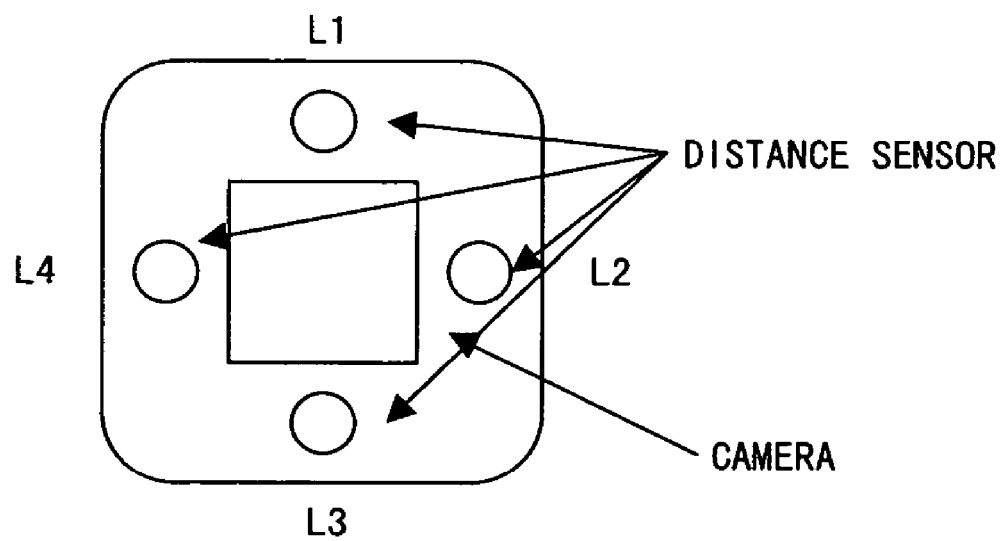
FIG. 16 is a diagram (No. 4) showing operation of the state calculation portion.

Operation when four distance sensors are placed is as follows. The four distance sensors are placed as shown in FIG. 16.

In accordance with output values L1, L2, L3, and L4 of the four distance sensors, there are the following three patterns.

(1) No capture target is held over the capture device.

In this case, any four distance sensors cannot measure the distance.

L1, L2, L3, L4=Measurement is impossible.

In this case, the capture device does not execute any operation.

(2) When the capture target is held over the capture device, but displaced.

In this case, some of the four distance sensors output normal values, and the rest cannot measure the distance. The concrete cases are as follows.

(i) When only one of the distance sensors outputs a normal value.

When L1 is a normal value, the target object is displaced upward.
When L2 is a normal value, the target object is displaced right.
When L3 is a normal value, the target object is displaced downward.
When L4 is a normal value, the target object is displaced left.

(ii) When two of the distance sensors output normal values.

When L1 and L2 are normal values, the target object is displaced right and upward.

When L2 and L3 are normal values, the target object is displaced right and downward.

When L3 and L4 are normal values, the target object is displaced left and downward.

When L4 and L1 are normal values, the target object is displaced left and upward.

In case of combinations other than the above-described combinations, it cannot be found how the capture target is displaced, so that the capture device does not execute any operation.

(iii) When three of the distance sensors output normal values (one cannot measure the distance).

When L1 is abnormal, the capture target is displaced downward.

When L2 is abnormal, the capture target is displaced left.

When L3 is abnormal, the capture target is displaced upward.

When L4 is abnormal, the capture target is displaced right.

When the capture target is displaced, the capture device displays a message encouraging a correction of the displacement.

3. When the capture target is held over the capture device without displacement.

In this case, all the four distance sensors outputs normal values.

L1, L2, L3, L4 =normal value

In this case, a tilt θ of the capture target is found using the four distances L1 to L4, and the image is corrected and a message is displayed in accordance with a value of θ.

Figure 17:
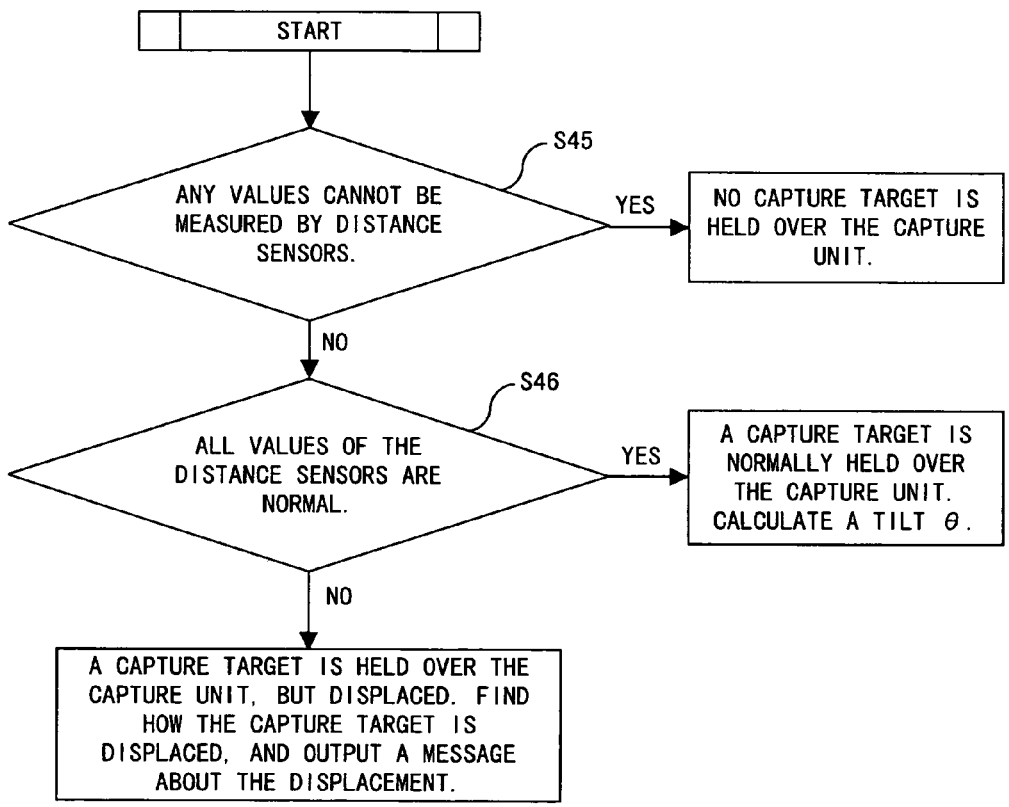
FIG. 17 is a diagram (No. 5) showing an operation of the state calculation portion.

FIG. 17 is a flowchart of operation of the state calculation portion 31.

FIG. 17 is applicable to both cases of two distance sensors and of four distance sensors.

First, in Step S45, it is determined whether any distance sensors cannot measure values of the distances. When the determination in Step S45 is YES, it is determined that no capture target is held over the capture device. When the determination in Step S45 is NO, it is determined whether all values of the distance sensors are normal in Step S46. When the determination in Step S46 is YES, it is determined that the capture target is held over the capture target, and then a tilt θ of the capture target is calculated. When the determination in Step S46 is NO, it is determined that the capture target is held over the capture target, but displaced. Then, it is found how the capture target is displaced, and a message about the displacement is outputted.

Figure 18:
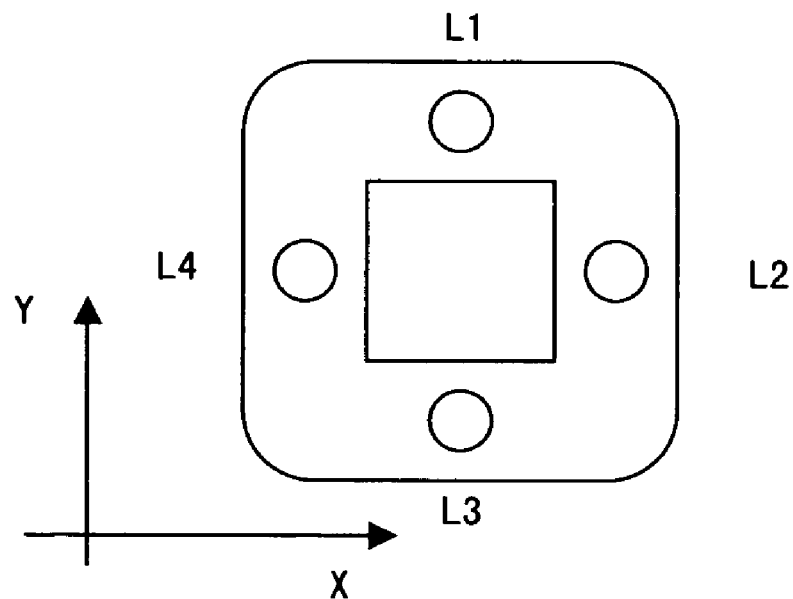
FIG. 18 is a diagram showing a method for finding a tilt when the capture target is three-dimensionally tilted.

FIG. 18 is a diagram showing how to find a tilt of a capture target when the tilt is three-dimensional.

A method for finding a tilt θ when the tilt of the capture target is three-dimensional is shown below.

First, a capture target is assumed a plane in three-dimension. The plane in three-dimension can be described using the following expression.

$$ax+by+cz+d=0 \qquad \text{(expression 1)}$$

A point on the plane is shown by (x, y, z). The above expression shows a condition to be satisfied by (x, y, z). Unknown parameters (a, b, c, d) are in the expression. The parameters are found using output values of the distance sensors.

FIG. 18 is a front view of the capture device, in which view, X-Y axes are defined. Coordinates of the four distance sensors are defined as follows (D is a distance between distance sensors).

Position of distance sensor L1 (0, D/2)
Position of distance sensor L2 (D/2, 0)
Position of distance sensor L3 (0, −D/2)
Position of distance sensor L4 (−D/2, 0)

When distances measured by the four sensors are L1, L2, L3, and L4, four points on the plane of the capture target can be shown as follows (a measurement point is a point at which a longitudinal extension of the distance sensor crosses the capture target).

Measurement point of distance sensor L1 (0, D/2, L1)
Measurement point of distance sensor L2 (D/2, 0, L2)
Measurement point of distance sensor L3 (0, −D/2, L3)
Measurement point of distance sensor L4 (−D/2, 0, L4)

From a condition that the capture target passes through these four points, a plane of the capture target of the expression 1 can be found. When the plane of the expression 1 can be found, a tilt of the capture target can be calculated. For example, by calculating a dot product of a normal vector (a, b, c) of the plane and, e.g., a vector (1, 0, 0) of the axis x, a tilt relative to the x axis can be found.

Figure 19:
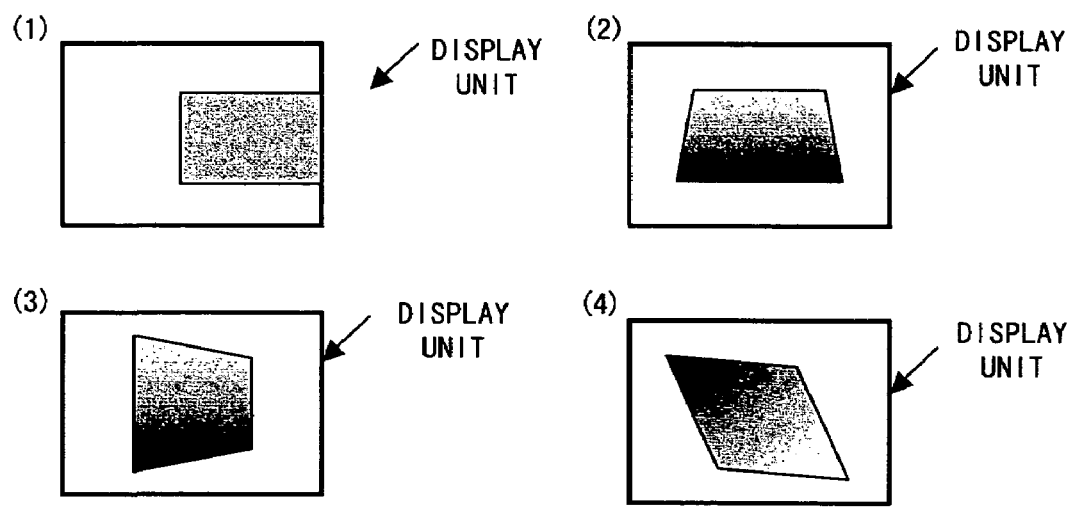
FIG. 19 is a diagram (No. 1) showing an example of a message outputted from an output portion.
Figure 20:
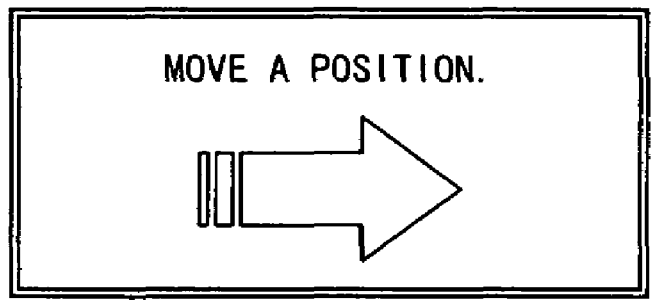
FIG. 20 is a diagram (No. 2) showing an example of a message outputted from the output portion.
Figure 21:
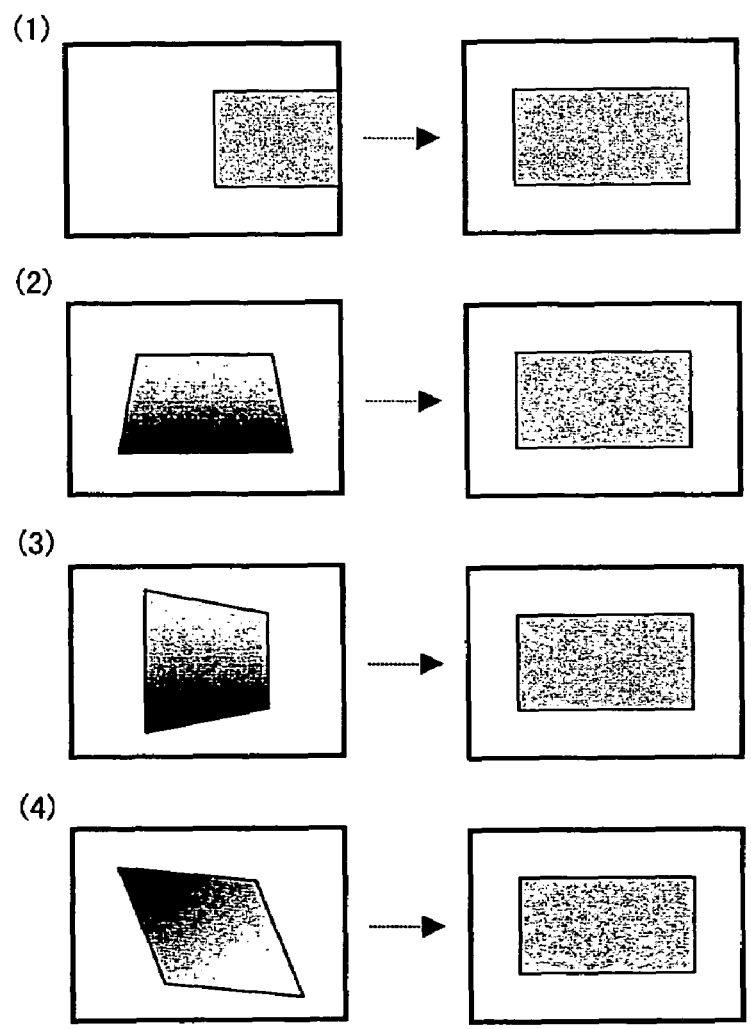
FIG. 21 is a diagram (No. 3) showing an example of a message outputted from the output portion.

FIGS. 19 to 21 are diagrams showing examples of messages outputted from the output portion.

In accordance with a state of the detected capture target, messages encouraging a user to correct the way in which the capture target is held over the capture device are outputted. Examples of the messages are explained. The message examples corresponding to four states 1 to 4 are shown below ("right" and "upward" means directions seen from the user).

State 1: When a paper is displaced right (a massage encouraging a correction of the displacement is outputted).

State 2: When an upper side of the paper is displaced downward (a massage encouraging a correction of the tilt is outputted).

State 3: When a right side of the paper is displaced downward (a massage encouraging a correction of the tilt is outputted).

State 4: When upper and right sides of the paper are displaced downward (a massage encouraging a correction of the tilt is outputted).

(1) Message Using Characters (or Sound)

The following messages are outputted using characters or sound to encourage a user to correct the way in which a capture target is held over the capture device.

State 1: "Move a paper right."
State 2: "Move a paper upward."
State 3: "Move upward a right side of a paper."
State 4: "Move upward upper and right sides of a paper."

(2) Example of Use of Two-Dimensional Graphics

As shown in FIG. 19 or 20, by use of two-dimensional graphics, a current state of a capture target is notified to a user, who is then encouraged to correct the way in which the capture target is held over the capture device. Namely, graphics 1 to 4 of FIG. 19 correspond to the above states 1 to 4. The user recognizes a current position and tilt of the capture target from shapes of the two-dimensional graphics, and changes an attitude of the capture target so that the capture target is in a correct position and in a correct direction. In case of the sate 1 (displacement), as shown in FIG. 20, the message can be displayed using a simple graphic such as an arrow.

(3) Example of Use of Three-Dimensional Animation

As shown in FIG. 21, a current state of the capture target and a state of the corrected capture target can be notified to the user by continuously displaying the states by use of animation. Graphics 1 to 4 of FIG. 21 corresponds to the states 1 to 4 of the capture target described above. By use of a three-dimensional animation, the user understands a placement state of the capture target more easily.

Additionally, some of these messages may be combined with each other. For example, the three-dimensional animation and sound can be combined with each other to output the message.

Figure 22:
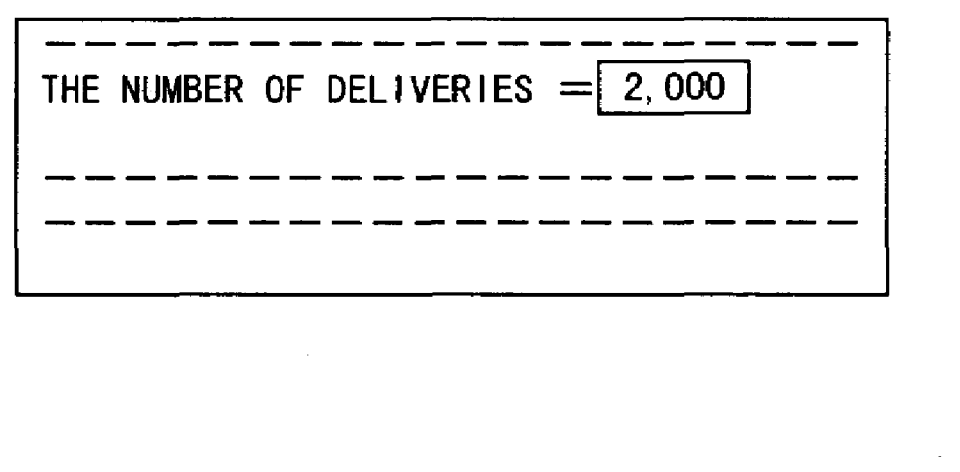

FIG. 22 is a diagram showing a modification when the capture device according to the embodiment of the present invention is used as a reading device for receipts.

Each space of a document whose format is previously fixed, such as a receipt, can be provided with a different color. For example, it is previously determined that the number of deliveries is written on a red-colored frame of a delivery slip, and other spaces are colored blue. When a blue light is illuminated onto the slip by use of the illumination of the capture device, the blue spaces are invisible, so that only the number of deliveries is visible. In such a manner, important spaces of a document are colored differently, so that only a required space can be captured by switching different colored lights. As a result, an accuracy for reading receipts can be improved.

Figure 23:
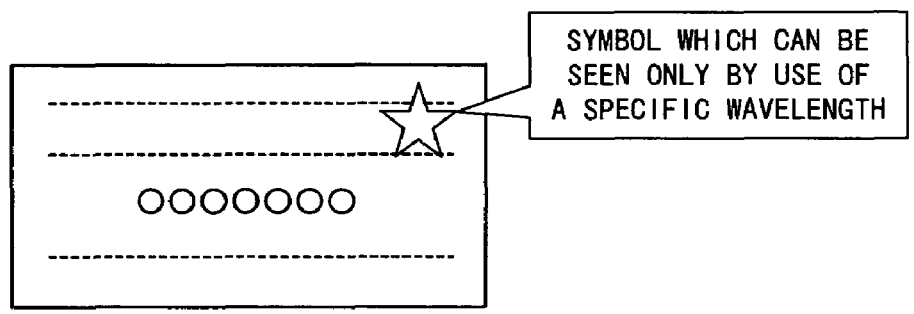
FIG. 23 is a diagram showing a modification point when the capture device according to the embodiment of the present invention is used as a reader unit for reading checks.

FIG. 23 is a diagram showing a modification when the capture device according to the embodiment of the present invention is used as a reading device for checks.

Checks, etc, maybe counterfeited. Therefore, by use of a specific ink which is visible only under a wavelength other than human-visible lights such as ultraviolet wave, a predetermined symbol, etc, is written on the checks to avoid the counterfeit.

By use of the present invention, because a non-contact type personal capture device can measure a tilt and position of a capture target, an accuracy for reading, e.g., receipts and checks is improved. Additionally, by measuring the tilt and position, and feeding them back to a user, the user can be provided with a comfortable usage environment.

The foregoing invention has been described in terms of preferred embodiments. However, those skilled, in the art will recognize that many variations of such embodiments exist. Such variations are intended to be within the scope of the present invention and the appended claims.

What is claimed is:

1. A capture device for capturing an image of a capture target to process information about the capture target, comprising:
   a capture unit for capturing the capture target;
   a plurality of distance sensors provided around the capture unit, for measuring a distance from the capture unit to the capture target; and
   a determination unit for determining an attitude and position of the capture target from the results of measurements by the plurality of the distance sensors,
   wherein the capture target is captured in such a manner that the capture target is held over the capture unit.

2. A capture device according claim 1, further comprising a conversion unit for converting, to an image in a correct attitude or position, an image of the capture target captured in a state that an attitude or position of the capture target is displaced.

3. A capture device according claim 1, further comprising a display unit for displaying a command to correct the posture or position of the capture target to a user who is holding the capture target over the capture unit.

4. A capture device according to claim 1, further comprising:
   a buffer for storing images of the capture target,
   wherein the images in the buffer are sequentially captured when variation of measured values of the plurality of the distance sensors is in a range of predetermined values,
   and wherein an image captured at a time that the variation of the measured values of the plurality of the distance sensors is the smallest is selected from the images stored in the buffer.

5. A capture device according to claim 1, further comprising an illumination unit for illuminating a light onto the capture target.

6. A capture device according to claim 5, wherein the illumination unit illuminates lights having different wavelengths onto the capture target.

7. A capture method for capturing an image of a capture target to process information about the capture target, comprising:
   installing a capture unit for capturing the capture target;
   measuring a distance from the capture unit to the capture target by use of a plurality of distance sensors provided around the capture unit; and
   determining an attitude or position of the capture target from results of measurements by the plurality of the distance sensors,
   wherein the capture target is captured in such a manner that the capture target is held over the capture unit.

8. A capture method according to claim 7, further comprising
   converting, to an image in a correct attitude or position, an image of the capture target captured in a state that the attitude or position of the capture target is displaced.

9. A capture method according to claim 7, further comprising
   displaying a command to correct the attitude or position of the capture target to a user who is holding the capture target over the capture unit in accordance with a determination in the determination step.

10. A capture method according to claim 7, comprising
    a buffer step for storing images of the capture target which starts to be continuously captured when variation of measured values of the plurality of the distance sensors is in a range of predetermined values,
    wherein an image at a time that the variation of the measured values is the smallest is selected as a captured image from the images stored in the buffer step.

11. A capture method according to claim 7, further comprising illuminating a light onto the capture target.

12. A capture method according to claim 11, wherein a light having a different wavelength is illuminated onto the capture target in the illumination step.

13. An image capture method, comprising:
    capturing an image of a target by a user holding of an image capture unit in a position to capture the image of the target;
    measuring distances to the target by distance measurement sensors surrounding the image capture unit; and
    determining a position and attitude of the target from the distances.

* * * * *